June 28, 1960 C. CASTELLI 2,942,764
DISPENSING CUTTER
Filed May 22, 1956

INVENTOR
Charles Castelli
BY
ATTORNEY

United States Patent Office 2,942,764
Patented June 28, 1960

2,942,764

DISPENSING CUTTER

Charles Castelli, New Brunswick, N.J., assignor to Johnson & Johnson, a corporation of New Jersey Filed May 22, 1956, Ser. No. 586,591

1 Claim. (Cl. 225—51)

This invention relates to dispensers for dental floss or other threads or filaments. More particularly, the invention is concerned with means for dispensing material such as dental floss and for severing or cutting off desired lengths from the end thereof.

In cutters for dental floss or other filaments, it is known practice to utilize a sheet metal tongue or similar element as the cutting instrumentality, the filament being wrapped around the tongue and more or less wedged between it and the base or supporting body member, so that it may be severed against an edge of the tongue by exerting tension or by a sudden jerk. In such cutters, there is a tendency for the filament to slide and scrape and it is an object of the present invention to provide a more secure engagement and gripping of the filament by the cutting tongue so as to assist in the cutting operation.

In cutters of this general type, even where the filament may be severed satisfactorily, there is a tendency for the severed end to come loose from the back of the cutting tongue, perhaps becoming inaccessible due to passing back through the opening in the spool casing associated with the cutter. A second object of the present invention is to provide a cutter which will hold the severed filament end between severing operations and at the same time permit easy dislodgement of this end in preparation for reeling off a length of filament for the next cutting.

A dispenser embodying the invention in a preferred form will now first be described with reference to the accompanying drawing, and the features forming the invention will then be pointed out in the appended claim.

In Castelli, Meares and Gershen application, Serial No. 586,590, filed May 22, 1956, for Dispenser for Dental Floss and Other Filaments, there is disclosed an improved dispenser unit, comprising a plastic casing equipped with metal cutting unit and adapted to hold and dispense dental floss. The claim of the present application is directed to the cutting unit per se and to the combination of a special form of cutting unit as disclosed herein with certain casing features as hereinafter set forth. Specific details of the casing structure forming no part of the present invention, are described in the above mentioned application and will not be described herein.

Figure 1:
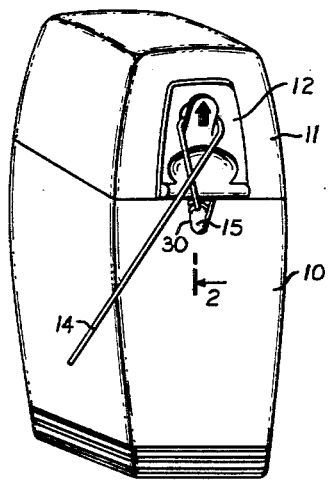
Fig. 1 is an isometric view of a dental floss dispenser embodying the invention.

The dispenser is composed of three elements, casing bottom or body 10, casing top or cover 11 and cutter element 12, a spool of floss 13 being contained in the casing and having its end 14 brought out through an aperture 15 and wrapped around the cutter for severing, as indicated in Fig. 1.

Figure 6:
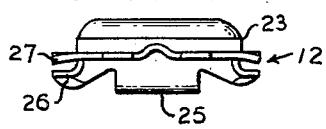
Fig. 6 is a bottom plan view of the cutter element.
Figure 7:
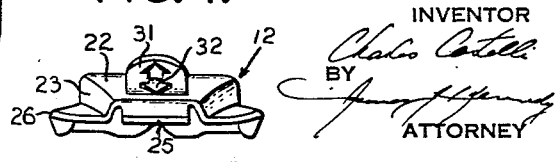
Fig. 7 is a top plan view thereof.

The casing top and bottom are preferably molded of plastic such as polystyrene. The top is formed with a shoulder 16 and an extension 17 below this shoulder which fits within the bottom 10. The extension 17 has ribs 18 which snap into grooves 19 in the inner wall of the bottom 10 for holding the parts together, and is also formed at its corners with downwardly extended and outwardly projecting enlargements 20. The enlargements 20 fitting inside the corners of the bottom 10 tend to stretch the sides thereof, pushing the grooves 19 firmly against the ribs 18 for holding the top and bottom together. As molded, the walls of the bottom 10 may be slightly convex so that this stretching action brings them inward for secure engagement of the top 11 and bottom 10. The top 11 has a side opening 21, which takes the metal fitting 12, the latter having a central portion or table 22 with a border 23 conforming to the wall of the opening 21 so that the table 22 may form a generally flush continuation of the surface of the top 11 surrounding the opening 21. Above the opening 21, the top has a recess 24 which takes a tongue 25 formed on the member 11 and serves to hold the latter in place. The member 11 also has flanges 26 engaging the inner wall of the top 11 around the opening 21, which hold the fitting 12 from movement outwardly, and the bottom of the member 11 is formed with side projections 27 which are twisted as indicated (Fig. 6) and engage in recesses 28 formed in the downwardly projecting part 17 of the top 11. These side projections also engage under the shoulder 16 for holding the fitting 12 against upward movement. The lower end of the fitting 12 has a notch 29 which registers with an oppositely facing notch 30 on the bottom 10 (Fig. 1) to define the opening 15 through which the floss end 14 emerges from the casing of the dispensing unit.

Figure 2:
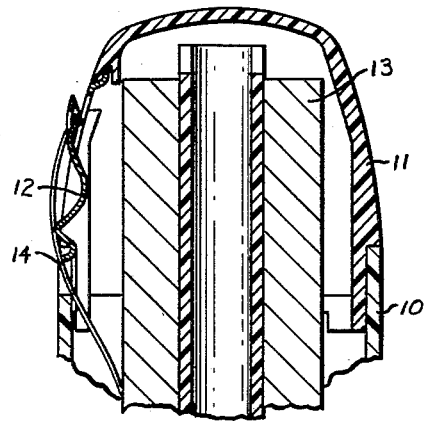
Fig. 2 is a central vertical section on the line 2—2 of Fig. 1 and on an enlarged scale.
Figure 3:
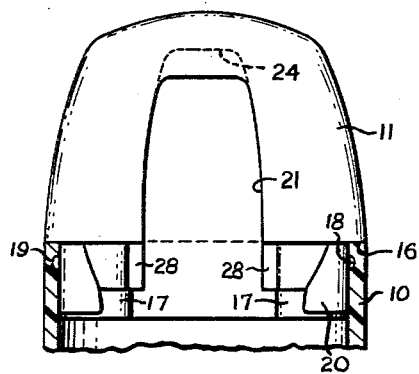
Fig. 3 is a front elevation of a top or cover element of the dispenser of Fig. 1.
Figure 5:
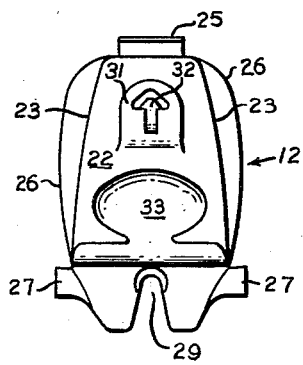
Fig. 5 is a front elevation of a cutter element shown as removed from the casing top of Fig. 3.
Figure 4:
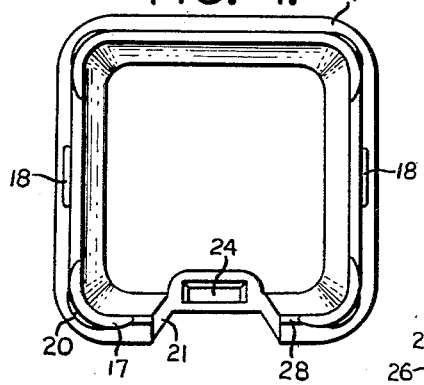
Fig. 4 is a bottom plan view of the cover of Fig. 3.

Centrally of the table 22 and toward the upper part thereof, a tongue 31 is struck out to form a thread or floss cutter, and the arrow shaped central part 32 of this tongue is struck and bent inwardly to form a thread or floss holder. Floss end 14 is wrapped around under the tongue 31 generally but outside the holding portion 32 thereof (Figs. 1 and 2) and the desired length is cut off by exerting tension on the free end so as to sever the floss against an edge (right hand edge in Fig. 1) of the tongue 31. Even after the free end 14 has thus been severed, the remainder of the thread in back of the tongue 31 is held securely in place by reason of its being wedged down in front of the element 32 and in back of the tongue 31 generally. The floss, as indicated in Fig. 1, passes below the arrow-shaped tip of the tab 32, so that if it should tend to lift, it would be engaged by the projecting base of this head where it extends outwardly beyond the shank of the tab 32 generally. The central part of the fitting 12 below the tongue 31 is formed with a recess or depression 33 across which the thread passes in going from the opening 15 to the cutting tongue 31, so that the bight of the floss end may readily be picked up with the fingers for pulling off the desired length of floss through the opening 15 and then disengaging the extreme end from elements 31, 32, in preparation for severing another length of floss.

What is claimed is:

A cutter for dental floss or other filament comprising a sheet metal body, an offset cutting tongue struck up from the said body for receiving a filament between itself and the body to cut the same against one of its edges upon application of tension, the central part of the said tongue being struck back inwardly forming a second tongue diverging from the first said tongue and its tip extending to the said body, the said tip of the second tongue being formed as an enlarged arrow-shaped head, whereby the filament section between the edges of the first said tongue may be wedged into the angle between the first and second said tongues below the said arrow-shaped head for holding the same during a cutting and thereafter.

References Cited in the file of this patent

UNITED STATES PATENTS

| | | |
|---|---|---|
| 992,324 | Yale | May 16, 1911 |
| 1,040,490 | Bauer | Oct. 8, 1912 |
| 1,044,014 | Butts | Nov. 12, 1912 |
| 1,152,825 | Litchfield | Sept. 7, 1915 |
| 1,210,207 | Roach | Dec. 26, 1916 |
| 1,229,504 | Olson | June 12, 1917 |
| 2,340,184 | Gray | Jan. 25, 1944 |

FOREIGN PATENTS

| | | |
|---|---|---|
| 19,077 | Great Britain | Nov. 25, 1890 |